(12) United States Patent
Barber et al.

(10) Patent No.: US 11,787,558 B2
(45) Date of Patent: Oct. 17, 2023

(54) FLIGHT INTERVAL MANAGEMENT GRAPHICAL SPEED PERFORMANCE MONITOR

(71) Applicant: Rockwell Collins, Inc., Cedar Rapids, IA (US)

(72) Inventors: Sarah Barber, Cedar Rapids, IA (US); Felix B. Turcios, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 832 days.

(21) Appl. No.: 16/397,113

(22) Filed: Apr. 29, 2019

(65) Prior Publication Data

US 2020/0339275 A1 Oct. 29, 2020

(51) Int. Cl.
*B64D 43/02* (2006.01)
*G06F 3/14* (2006.01)
*B64D 43/00* (2006.01)

(52) U.S. Cl.
CPC .............. *B64D 43/02* (2013.01); *G06F 3/14* (2013.01)

(58) Field of Classification Search
CPC .......... G06F 3/0482; G06F 3/14; B64D 43/02
See application file for complete search history.

(56) References Cited

U.S. PATENT DOCUMENTS

| | | | | |
|---|---|---|---|---|
| 6,199,008 B1 * | 3/2001 | Aratow | ................. | G06T 11/206 |
| | | | | 701/14 |
| 6,236,913 B1 * | 5/2001 | Bomans | ............... | G08G 5/0021 |
| | | | | 244/221 |
| 6,828,922 B1 * | 12/2004 | Gremmert | ............... | G01S 7/003 |
| | | | | 342/26 B |
| 6,917,860 B1 * | 7/2005 | Robinson | ............. | G08G 5/0034 |
| | | | | 340/963 |
| 7,312,725 B2 * | 12/2007 | Berson | .................. | G02B 27/01 |
| | | | | 345/9 |
| 7,467,031 B2 * | 12/2008 | King | .................... | G01C 23/005 |
| | | | | 701/4 |
| 8,046,165 B2 * | 10/2011 | Sacle | .................... | G08G 5/0013 |
| | | | | 701/16 |
| 9,714,081 B1 * | 7/2017 | Hall, III | ................. | B64D 47/00 |
| 10,074,282 B1 | 9/2018 | Wilber | | |
| 10,783,288 B1 * | 9/2020 | Timar | .................... | G08G 5/025 |

(Continued)

FOREIGN PATENT DOCUMENTS

EP 3509052 A1 7/2019

OTHER PUBLICATIONS

Extended Search Report for European Application No. 19216183.4 dated Jul. 10, 2020, 7 pages.

(Continued)

*Primary Examiner* — Nicholas Augustine
(74) *Attorney, Agent, or Firm* — Suiter Swantz pc llo

(57) ABSTRACT

A system, a device, and a method. The system may include a display configured to present images to a pilot and a processor communicatively coupled to the display. The processor may be configured to generate a speed performance monitor graphical user interface (GUI), the speed performance monitor GUI depicting flight deck interval management (FIM) information. The processor may be further configured to output graphical data associated with the speed performance monitor GUI to the display for presentation to the pilot.

19 Claims, 9 Drawing Sheets

(56) References Cited

U.S. PATENT DOCUMENTS

| | | | | |
|---|---|---|---|---|
| 2008/0109160 A1* | 5/2008 | Sacle | ............... | G08G 5/0013 |
| | | | | 701/33.4 |
| 2009/0112464 A1* | 4/2009 | Belcher | ............ | G08G 5/0052 |
| | | | | 701/414 |
| 2010/0131186 A1* | 5/2010 | Geelen | ............. | G06Q 50/01 |
| | | | | 715/835 |
| 2014/0249701 A1* | 9/2014 | Latsu-Dake | ........ | G08G 5/0021 |
| | | | | 701/14 |
| 2016/0179327 A1* | 6/2016 | Zammit-Mangion | ............ | |
| | | | | G06F 3/0482 |
| | | | | 701/3 |
| 2017/0358219 A1* | 12/2017 | Garai | ............. | G08G 5/003 |
| 2019/0113403 A1* | 4/2019 | Adams | ............ | B64C 27/04 |
| 2019/0213890 A1* | 7/2019 | Hosamani | ........ | G08G 5/0008 |
| 2020/0088542 A1* | 3/2020 | Feyereisen | ......... | B64D 43/02 |
| 2020/0105145 A1* | 4/2020 | Feyereisen | ......... | B64D 43/02 |
| 2020/0340827 A1* | 10/2020 | Gepner | ............ | G01C 23/005 |

OTHER PUBLICATIONS

Latorella Kara et al: "Preference and operational acceptability of Flightdeck Interval Management avionics", 2013 IEEE/AIAA 32nd Digital Avionics Systems Conference (DASC), IEEE, Oct. 5, 2013 (Oct. 5, 2013), pp. 1-27, XP032553318, ISSN: 2155-7195, DOI: 10.1109/DASC.2013.6719609 [retrieved on Jan. 22, 2014] * p. 9-p. 14 *.

* cited by examiner

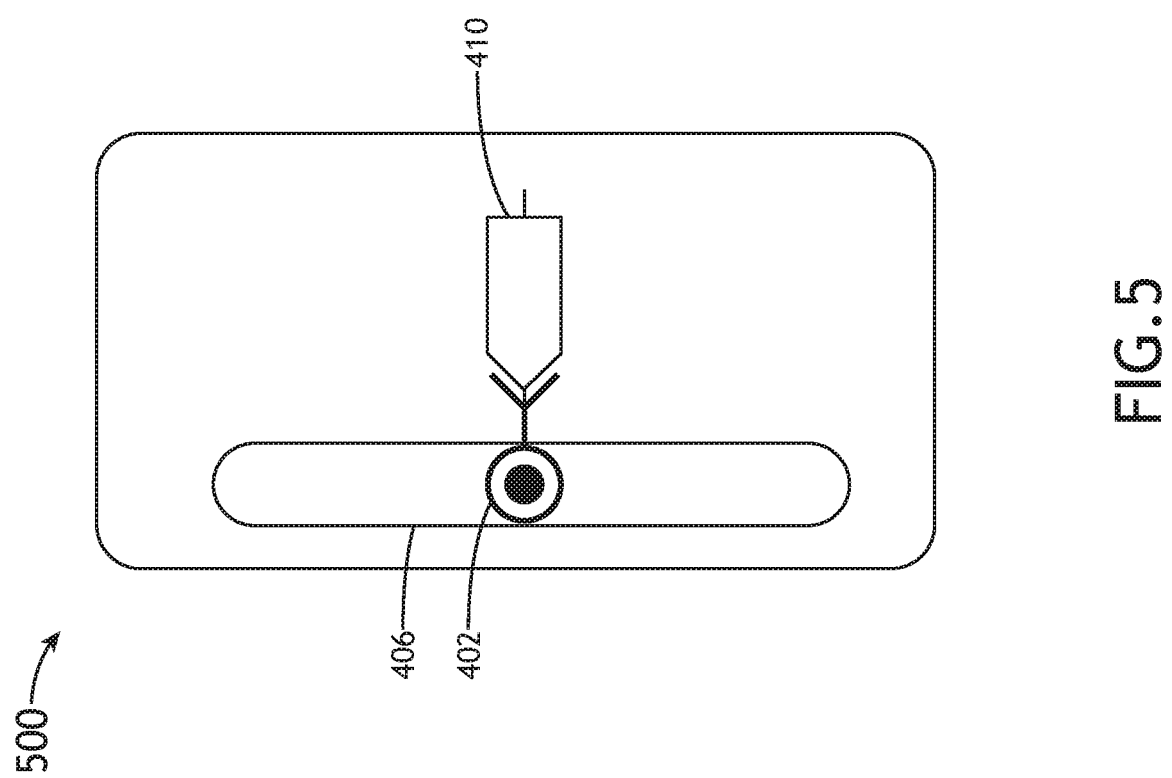

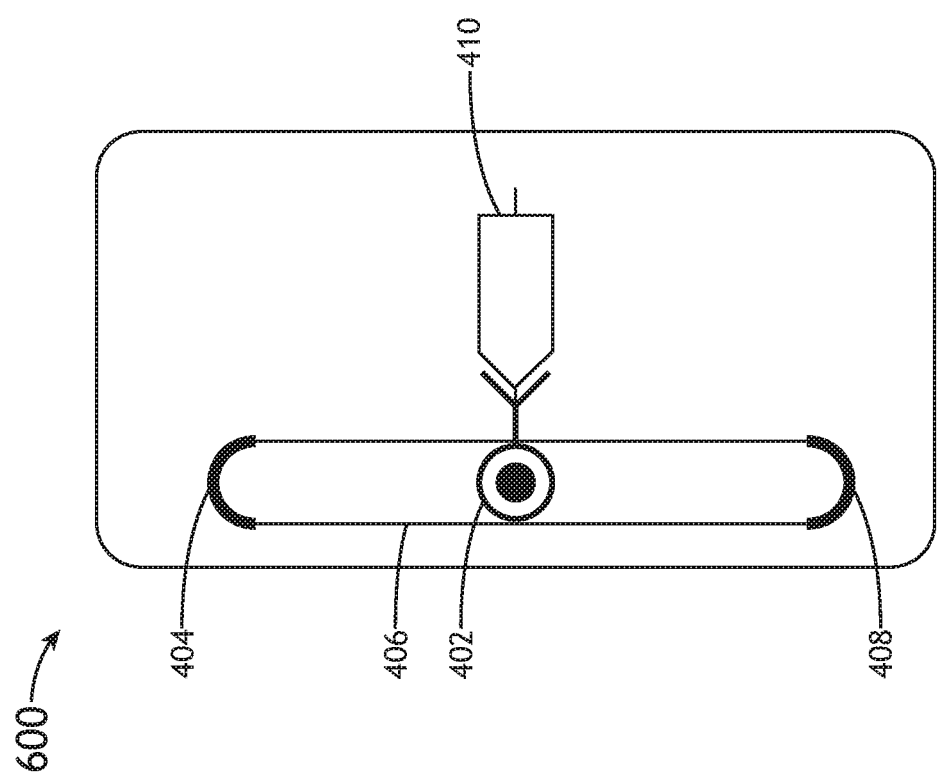

FLIGHT INTERVAL MANAGEMENT GRAPHICAL SPEED PERFORMANCE MONITOR

BACKGROUND

By Jan. 1, 2020, all aircraft operating in those segments of the National Airspace System defined in 14 CFR 91.255, must operate with "automatic dependent surveillance-broadcast (ADS-B) Out" equipment installed. The equipment will broadcast surveillance information about the aircraft, including three-dimensional position and velocity, along with additional integrity and accuracy information.

Some operators may opt to install "ADS-B In" equipment, which allows for the display of aircraft traffic through flight deck applications such as cockpit display of traffic information (CDTI). At a minimum, CDTI can provide the flight crew with Situation Awareness of the location, altitude, vertical velocity, horizontal velocity, and track of other traffic around their aircraft.

ADS-B technology also enables the development of algorithms and applications which can improve air traffic flow into and out of busy terminal areas. One such application is flight deck interval management (FIM), whereby air traffic control (ATC) assigns a time or distance spacing interval (goal), for one aircraft to maintain relative to a designated target aircraft.

The Minimum Operational Performance Standards (MOPS) for Flight Deck Interval Management (FIM) are contained in RTCA DO-361.

Current aircraft display implementations lack the ability to display FIM assigned time or distance spacing intervals for an aircraft to maintain relative to other aircraft.

SUMMARY

In one aspect, embodiments of the inventive concepts disclosed herein are directed to an aircraft system. The aircraft system may include a display configured to present images to a pilot and a processor communicatively coupled to the display. The processor may be configured to generate a speed performance monitor graphical user interface (GUI), the speed performance monitor GUI depicting flight deck interval management (FIM) information. The speed performance monitor GUI may include: an interval management (IM) speed range indicator depicting an IM speed range; an IM speed upper limit indicator depicting an IM speed upper limit and implemented at a first end of the IM speed range indicator; an IM speed lower limit indicator depicting an IM speed lower limit and implemented at a second end of the IM speed range indicator; an IM speed target indicator depicting an IM speed target; and a current speed indicator depicting a current speed relative to the IM speed target. The processor may be further configured to output graphical data associated with the speed performance monitor GUI to the display for presentation to the pilot.

In a further aspect, embodiments of the inventive concepts disclosed herein are directed to a display device. The display device may include a display configured to present images to a pilot and a processor communicatively coupled to the display. The processor may be configured to generate a speed performance monitor graphical user interface (GUI), the speed performance monitor GUI depicting flight deck interval management (FIM) information. The speed performance monitor GUI may include: an interval management (IM) speed range indicator depicting an IM speed range; an IM speed upper limit indicator depicting an IM speed upper limit and implemented at a first end of the IM speed range indicator; an IM speed lower limit indicator depicting an IM speed lower limit and implemented at a second end of the IM speed range indicator; an IM speed target indicator depicting an IM speed target; and a current speed indicator depicting a current speed relative to the IM speed target. The processor may be further configured to output graphical data associated with the speed performance monitor GUI to the display for presentation to the pilot.

In a further aspect, embodiments of the inventive concepts disclosed herein are directed to a method. The method may include generating a speed performance monitor graphical user interface (GUI), the speed performance monitor GUI depicting flight deck interval management (FIM) information. The speed performance monitor GUI may include: an interval management (IM) speed range indicator depicting an IM speed range; an IM speed upper limit indicator depicting an IM speed upper limit and implemented at a first end of the IM speed range indicator; an IM speed lower limit indicator depicting an IM speed lower limit and implemented at a second end of the IM speed range indicator; an IM speed target indicator depicting an IM speed target; and a current speed indicator depicting a current speed relative to the IM speed target. The method may further include outputting graphical data associated with the speed performance monitor GUI to a display for presentation to a pilot.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 5 is an exemplary view of a speed performance monitor GUI according to the inventive concepts disclosed herein.

FIG. 6 is an exemplary view of a speed performance monitor GUI according to the inventive concepts disclosed herein.

DETAILED DESCRIPTION

Figure 1:
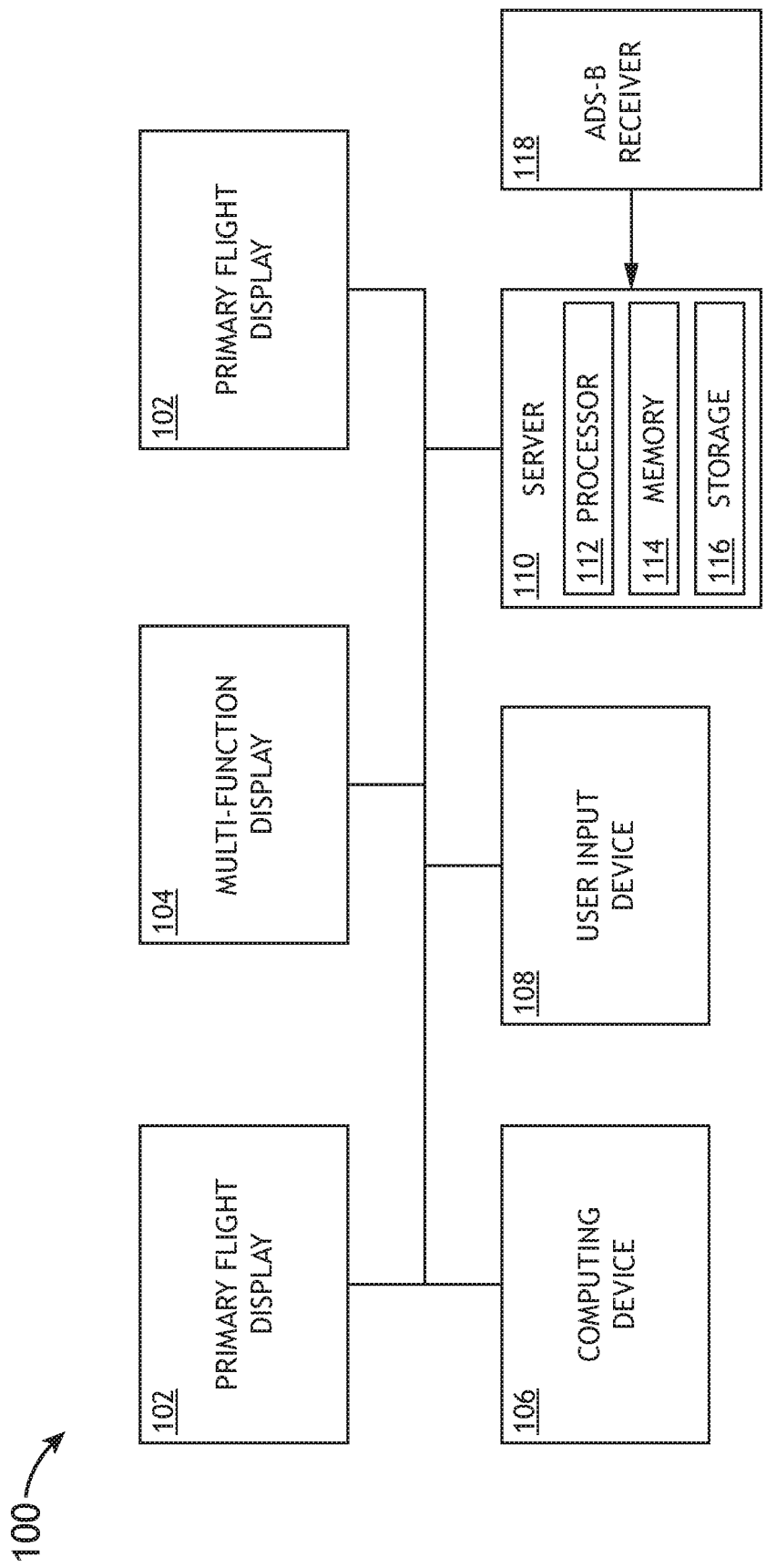
FIG. 1 is a view of an exemplary embodiment of a system implemented in an aircraft according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of or sub-combination of two or more such features, along with any other features which may not necessarily be expressly described or inherently present in the instant disclosure.

Broadly, embodiments of the inventive concepts disclosed herein are directed to a system, device, and a method configured to generate a speed performance monitor graphical user interface (GUI) depicting FIM information and to output graphical data associated with the generated GUI to a display for presentation to a user (e.g., a pilot).

In some embodiments, full integration of a FIM application may be feasible on forward-fit aircraft, whereby the application can be hosted in a main avionics system and interface with existing displays, controls, systems, and applications to attain and maintain the assigned spacing interval. In some embodiments, for retrofit platforms, the FIM application may be hosted in an electronic flight bag (EFB) or a tablet computing device environment, which may also provide the CDTI function. In these installations, FIM target speeds may have to be input manually by the flight crew to an auto-flight system. A small auxiliary display may also be used concerning the visibility of certain information elements in the pilots' forward field of view.

In some embodiments, Airborne Surveillance and Separation Assurance Processing (ASSAP) may be configured to limit the interval management (IM) speed for: maximum operating speed; minimum final approach speed; maximum speed for current aircraft configuration; and IM speed upper limit and IM speed lower limit, which may be adjustable at any time by flight crew. In some embodiments, ASSAP may set the IM Speed Too Low for Current Configuration Status to "Active" when the IM Speed is less than the Minimum Safe Speed for the Current Configuration. In some embodiments, ASSAP may set the IM Speed Too Low for Current Configuration Status to "Inactive" when the IM Speed is greater than or equal to the Minimum Safe Speed for the Current Configuration. In some embodiments, when the IM Speed Mach/calibrated airspeed (CAS) selection is computed in CAS, ASSAP may evaluate the IM Speed Conformance Monitoring Status on one (1) second intervals starting 11 seconds after the new IM Speed, and ending when Ownship's CAS is within 5 knots of the new IM Speed. In some embodiments, when the IM Speed Mach/CAS selection is computed in Mach, ASSAP may evaluate the IM Speed Conformance Monitoring Status on one (1) second intervals starting 11 seconds after the new IM Speed, and ending when Ownship's Mach is within 0.02 Mach of the new IM Speed. In some embodiments, when the IM Speed Mach/CAS selection is computed in CAS and when a new IM Speed is less than Ownship's CAS, ASSAP may set the IM Speed Conformance Monitoring Status to "Out of Conformance" if Ownship's CAS is more than 5 knots faster than the Expected Speed Change Profile. In some embodiments, when the IM Speed Mach/CAS selection is computed in CAS and when a new IM Speed is greater than Ownship's CAS, ASSAP may set the IM Speed Conformance Monitoring Status to "Out of Conformance" if Ownship's CAS is more than 5 knots slower than the Expected Speed Change Profile. In some embodiments, when the IM Speed Mach/CAS selection is computed in Mach and when a new IM Speed is less than Ownship's Mach, ASSAP may set the IM Speed Conformance Monitoring Status to "Out of Conformance" if Ownship's Mach is more than 0.02 Mach faster than the Expected Speed Change Profile. In some embodiments, when the IM Speed Mach/CAS selection is computed in Mach and when a new IM Speed is greater than Ownship's Mach, ASSAP may set the IM Speed Conformance Monitoring Status to "Out of Conformance" if Ownship's Mach is more than 0.02 Mach slower than the Expected Speed Change Profile. In some embodiments, the CDTI may provide the IM Speed Change Visual Advisory to the Flight Crew when IM Speed has changed. In some embodiments, in aircraft that do not have automated means to inform the Flight Crew of the safe maneuvering speed for the current flaps configuration the CDTI may provide an Alert to the Flight Crew, consistent with flight deck philosophy, whenever the IM Speed Too Low for Current Configuration Status is set to "Active."

Some embodiments may include a speed performance monitor GUI depicted on a display that may be used during interval management (IM) operations. The graphical display may allow a flight crew to monitor the speed performance of an aircraft relative to an assigned target speed, and in conformance with general performance limitations of the aircraft. The speed performance monitor GUI may be displayed on any suitable display, such as a multi-function display or touchscreen in a cockpit in a forward-fit aircraft. For retrofit solutions, the speed performance monitor GUI may be displayed as part of an auxiliary display, positioned in the pilots' forward field of view. Additionally, in some embodiments, the speed performance monitor GUI may be displayed on a mobile display device (e.g., a tablet computing device or an EFB).

Embodiments may improve the field of aviation by improving safety and improving a pilot's situational awareness of IM operations.

Figure 3:
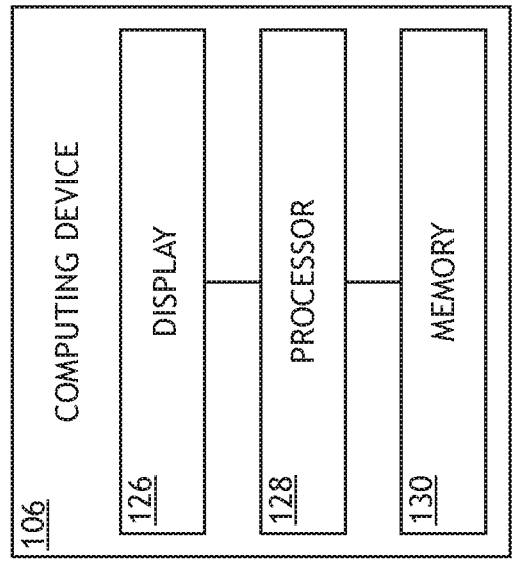
FIG. 3 is a view of a computing device of the system of FIG. 1 according to the inventive concepts disclosed herein.
Figure 2:
FIG. 2 is a view of a multi-function display of the system of FIG. 1 according to the inventive concepts disclosed herein.

Referring now to FIGS. 1, 2, and 3, an exemplary embodiment of a system (e.g., an aircraft system) implemented in an aircraft 100 according to the inventive concepts disclosed herein includes at least one display (e.g., three forward displays of a cockpit, such as two outboard primary flight displays 102 and a center multi-function display 104), a computing device 106 (e.g., a tablet computing device and/or an EFB), at least one user input device 108, at least one avionics computing device (e.g., an avionics server 110), and an ADS-B receiver 118, some or all of which may be communicatively coupled at any given time.

For example, a cockpit of the aircraft 100 may include a plurality of displays, such as three forward displays configured to present images to flight crew (e.g., pilot(s)). Two outboard primary flight displays 102 may be configured to display an attitude director indicator (ADI), a horizontal situation indicator (HSI), and optionally traffic targets, as well as other information. A center multi-function display 104 may be configured to generate and/or display a navigation map and optionally traffic targets. One or more of the displays 102, 104 (e.g., the center multi-function display 104) may be configured to execute a FIM application configured to manage IM operations for ATC assigned time or distance spacing intervals, for the aircraft 100 to maintain relative to a designated target aircraft. For example, execution of the FIM application may manage an IM speed range, an IM speed upper limit, an IM speed lower limit, an IM speed target, a current speed, an acceleration trend, and/or a deceleration trend. Additionally, one or more of the displays 102, 104 (e.g., the center multi-function display) may be configured to generate and/or display a speed performance monitor GUI (e.g., based at least on ADS-B In data associated with ADS-B traffic information from other aircraft in a vicinity of an aircraft), wherein the speed performance monitor GUI depicts FIM information. Additionally, while the center multi-function display 104 is exemplarily described as being configured to generate and/or display a speed performance monitor GUI, wherein the speed performance monitor GUI depicts FIM information, in some embodiments other displays (e.g., one or more of primary flight displays 102) may be configured as such.

Each of the displays 102, 104 may be configured to receive graphics data (e.g., graphics commands) and render graphics associated with such graphics data for display to a user (e.g., a pilot). Additionally, the displays 102, 104 may be configured to receive user inputs from the user input device 108 and change a display of content based on the user inputs, such as changing a cursor location. Each of the displays 102, 104 may include at least one display 120 (e.g., a display element), at least one processor 122, memory 124, and storage, which may be communicatively coupled. The at least one processor 122 may be configured to run various software applications or computer code stored (e.g., maintained) in a non-transitory computer-readable medium (e.g., memory 124 or storage) and configured to execute various instructions or operations, such as operations disclosed throughout.

In some embodiments, a cockpit of the aircraft 100 may include a computing device 106 (e.g., a tablet computing device and/or an EFB). In some embodiments, the computing device 106 may be configured to execute a FIM application configured to manage IM operations for ATC assigned time or distance spacing intervals, for the aircraft 100 to maintain relative to a designated target aircraft. For example, execution of the FIM application may manage an IM speed range, an IM speed upper limit, an IM speed lower limit, an IM speed target, a current speed, an acceleration trend, and/or a deceleration trend. Additionally, the computing device 106 may be configured to generate and/or display a speed performance monitor GUI (e.g., based at least on ADS-B In data associated with ADS-B traffic information from other aircraft in a vicinity of an aircraft), wherein the speed performance monitor GUI depicts FIM information.

The computing device 106 may include at least one display 126 (e.g., a display element), at least one processor 128, memory 130, and storage, which may be communicatively coupled. The at least one processor 128 may be configured to run various software applications or computer code stored (e.g., maintained) in a non-transitory computer-readable medium (e.g., memory 130 or storage) and configured to execute various instructions or operations, such as operations disclosed throughout.

The at least one user input device 108 may be configured to receive user inputs from a user (e.g., a pilot) and output user input data to one or more displays (e.g., two outboard primary flight displays 102 and a center multi-function display 104) and/or the avionics server 110. The user input device may be configured as a cursor control device. For example, the at least one user input device 108 may be implemented as a cursor control device, a mouse, a trackpad, a keyboard, a keypad, a touchscreen, an eye tracking system (e.g., comprising a processor and a sensor), and/or a voice recognition system (e.g., comprising a processor and a microphone). For example, the user input device 108 may output user input data to the displays and/or the server 110, which may track user inputs, such as cursor movement and cursor events (e.g., clicks or selections), received from the user input device 108.

The ADS-B receiver 118 may be configured to receive ADS-B In data associated with ADS-B traffic information from other aircraft and ground vehicles in the vicinity of the aircraft 100. The ADS-B traffic information may include detailed information of each other aircraft's position and intent. The ADS-B receiver 118 may be configured to output ADS-B In data to the server 110. The ADS-B receiver 118 may include a processor, memory, and storage, which may be communicatively coupled. The processor may be configured to run various software applications or computer code stored (e.g., maintained) in a non-transitory computer-readable medium (e.g., memory or storage) and configured to execute various instructions or operations.

The avionics server 110 may include at least one processor 112, memory 114, and storage 116, as well as other components, equipment, and/or devices commonly included in an avionics computing device, all of which may be communicatively coupled to one another. The server 110 may be configured to output data to one or more displays (e.g., two outboard primary flight displays 102 and a center multi-function display 104) and/or the computing device 106. Likewise, the server 110 may be configured to receive data from the user input device 108, the computing device 106, one or more displays (e.g., two outboard primary flight displays 102 and a center multi-function display 104), and/or the ADS-B receiver 118. The processor 112 may be configured to run various software applications or computer code stored (e.g., maintained) in a non-transitory computer-readable medium (e.g., memory 114 or storage 116) and configured to execute various instructions or operations. Additionally, for example, the server 110 or the processor 112 may be implemented as a special purpose computer or a special purpose processor configured (e.g., programmed) to execute instructions for performing any or all of the operations disclosed throughout. In some embodiments, the system 100 may include any suitable number of servers 110.

In some embodiments, the processor 112 may be configured to execute a FIM application configured to manage IM operations for ATC assigned time or distance spacing intervals, for the aircraft 100 to maintain relative to a designated target aircraft. For example, execution of the FIM application may manage an IM speed range, an IM speed upper limit, an IM speed lower limit, an IM speed target, a current speed, an acceleration trend, and/or a deceleration trend. Additionally, the processor 112 may be configured to generate a speed performance monitor GUI (e.g., based at least on ADS-B In data associated with ADS-B traffic information from other aircraft in a vicinity of an aircraft), wherein the speed performance monitor GUI depicts FIM information.

Referring now to FIGS. 4-9, exemplary views of the speed performance monitor GUI depicting FIM information are shown.

Figure 4:
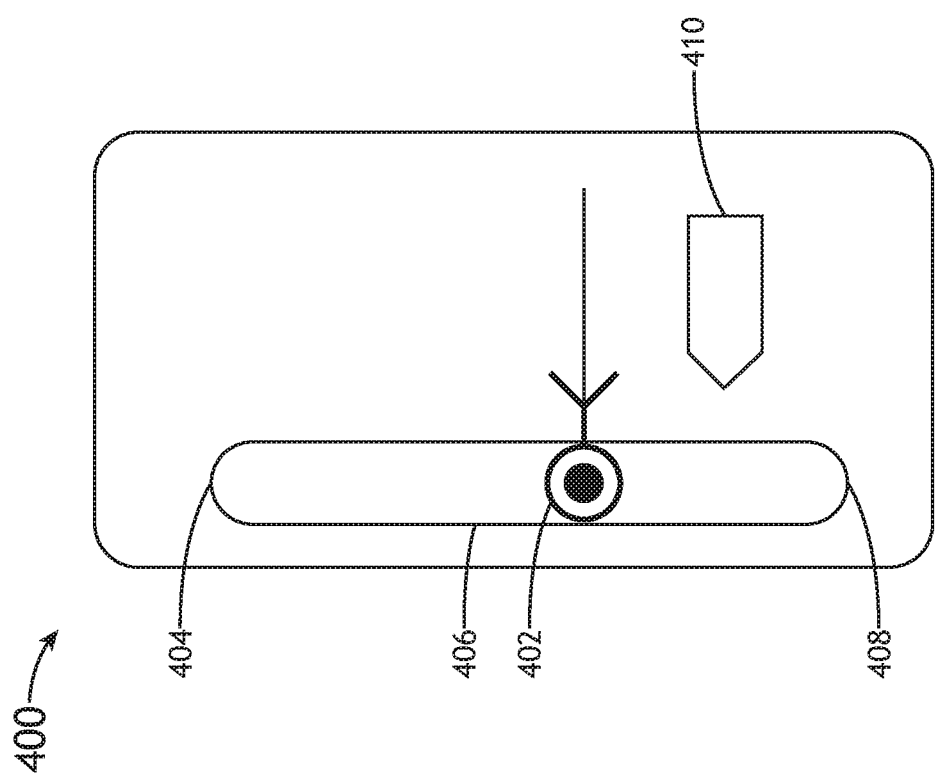
FIG. 4 is an exemplary view of a speed performance monitor graphical user interface (GUI) according to the inventive concepts disclosed herein.

Referring now to FIG. 4, an exemplary view 400 of the speed performance monitor GUI is shown. The speed performance monitor GUI may include an IM speed range indicator 406 depicting an IM speed range, an IM speed upper limit indicator 404 depicting an IM speed upper limit and implemented at a first end (e.g., a top) of the IM speed range indicator 406, an IM speed lower limit indicator 408 depicting an IM speed lower limit and implemented at a second end (e.g., a bottom) of the IM speed range indicator 406, an IM speed target indicator 402 depicting an IM speed target, and/or a current speed indicator 410 depicting a current speed relative to the IM speed target. Such graphical elements may be contained within a rounded rectangular border. During IM operations, the rounded rectangular border may be a first color (e.g., green) indicating that the speed performance monitor GUI is active during an "Execute" state (as defined by the MOPS), and may be a second color (e.g., white or grey) indicating that the speed performance monitor GUI is inactive during the remaining IM states, such as Awaiting Clearance Entry, Evaluate, Suspend, and/or Terminate. Depending on an operational environment, speeds may be indicated as calibrated airspeed (CAS) or Mach.

The IM speed range indicator 406 may include a range of acceptable target speeds. For example, the IM speed range indicator 406 may be implemented as a vertical capsule-shaped outline. When the range of acceptable target speeds is static, the IM speed range indicator 406 may be a first color (e.g., grey). When the range of acceptable target speeds changes, the IM speed range indicator 406 may be a second color (e.g., cyan) and/or may momentarily flash. For example, if the aircraft configuration changes, the IM speed range indicator 406 may change color and/or flash.

The IM speed upper limit indicator 404 depicting an IM speed upper limit may be implemented at a first end (e.g., a top) of the IM speed range indicator 406. The IM speed upper limit indicator 404 may be implemented as an endcap portion of the IM speed range indicator 406. The upper IM speed limit may be set to a maximum speed for the current aircraft configuration (e.g., based on slats, flaps, and/or gear position), or a default IM Speed Upper Limit (e.g., as set by the flight crew). In some embodiments, if the IM speed target exceeds the IM speed upper limit, the IM speed upper limit indicator 404 may change color and/or flash. In some embodiments, if an aircraft configuration changes, the IM speed upper limit indicator 404 may change.

The IM speed lower limit indicator 408 depicting the IM speed lower limit may be implemented at a second end (e.g., a bottom) of the IM speed range indicator 406. The IM speed lower limit indicator 408 may be implemented as an endcap portion of the IM speed range indicator 406. The lower IM speed limit may be set to the aircraft's safe (e.g., minimum) maneuvering speed or default IM Speed Lower Limit (e.g., as set by the flight crew). Maneuvering speed information is typically available within an integrated avionics system, and is part of the primary flight display's 102 low speed cueing system. For a retrofit application, data structures (e.g., lookup tables) maintained in memory may provide a conservative value, based on aircraft configuration and attitude. In some embodiments, if the IM speed target exceeds the IM speed lower limit, the IM speed lower limit indicator 408 may change color and/or flash. In some embodiments, if an aircraft configuration changes, the IM speed lower limit indicator may change.

The IM speed target indicator 402 depicting an IM speed target may provide the flight crew with instantaneous Situation Awareness of how the IM speed target relates to the current operational airspeed range of the aircraft 100. The IM speed target indicator 402 may reside at least partially within the IM speed range indicator 406. For example, the IM speed target indicator 402 may include a circular portion (e.g., a target-shaped portion) residing within the IM speed range indicator 406, a chevron portion residing outside of the IM speed range indicator 406, and a line from the circular portion extending through a vertex of the chevron portion. When the current speed matches the target speed, a portion of the current speed indicator 410 may align with the chevron portion of the IM speed target indicator 402. In some embodiments, at least a portion of the IM speed target indicator 402 flashes or changes color when a speed target value changes.

The current speed indicator 410 may depict the aircraft's 100 current speed in relation to the operational airspeed range. The difference in vertical position between the current speed indicator 410 and the line and vertex of the chevron portion of the IM speed target indicator 402 chevron portion indicates the current speed delta (difference between current aircraft speed and the target speed). The current speed indicator 410 may include a textual depiction of a speed differential between the current speed and the target speed (e.g., if the speed differential exceeds a predetermined speed differential). In some embodiments, the current speed indicator 410 includes a pentagonal-shaped outline, wherein two edges of the pentagonal-shaped outline align with the chevron portion of the IM speed target indicator 402 when the current aircraft speed and the target speed match. For example, when the current speed matches the target speed, a nose of the current speed indicator 410 may be positioned within the IM speed target indicator 402 chevron, as shown in FIG. 5 depicting an exemplary view 500 of the speed performance monitor GUI.

Referring now to FIG. 6, an exemplary view 600 of the speed performance monitor GUI is shown. In a fully integrated system, the ASSAP application should not provide IM speed targets that fall outside the current operational limitations of the aircraft 100. In non-integrated, or retrofit installations however, it is possible that the current aircraft configuration and/or limitations are not known to the application. In this case, the potential exists for the target speed to be set outside of the allowable operational range. If the upper and lower speed limits are set via look-up tables (as described above) and the speed target is either greater-than or less-than the limit values, the IM speed lower limit indicator 408 and/or the IM speed upper limit indicator 404 may change color (e.g., to amber) and/or flash, providing an appropriate alert to the flight crew.

Figure 7B:
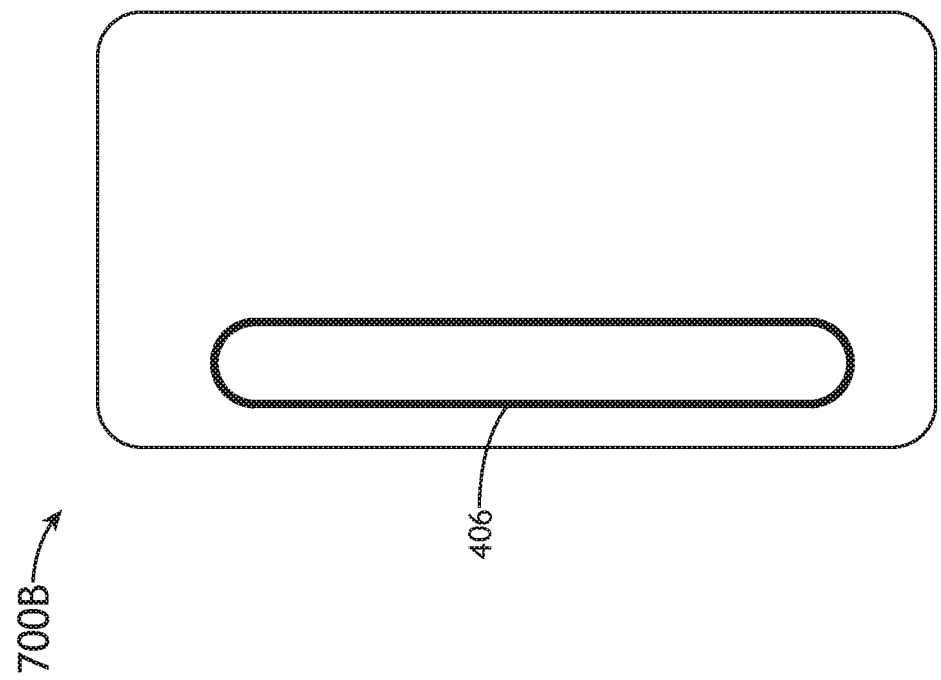
FIG. 7B is an exemplary view of a speed performance monitor GUI according to the inventive concepts disclosed herein.
Figure 7A:
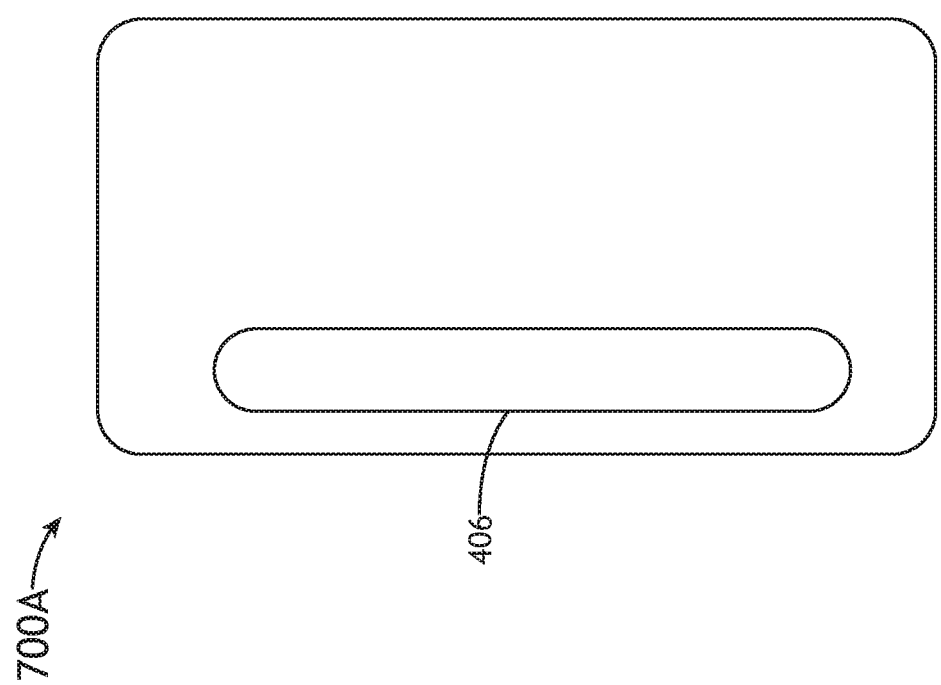
FIG. 7A is an exemplary view of a speed performance monitor GUI according to the inventive concepts disclosed herein.

Referring now to FIGS. 7A and 7B, exemplary views 700A, 700B of the speed performance monitor GUI are shown. Any time the aircraft configuration is changed (flaps/slats/gear extended or retracted), the operational speed range may also change, affecting the upper and lower speed limits. This can result in an instantaneous repositioning of the IM speed target indicator 402 within the IM speed range indicator 406 capsule outline. To advise the pilots that this has occurred, the capsule outline may change color (as shown in FIG. 7B) (e.g., to cyan) (indicating pilot input to secondary flight controls), and/or flash momentarily.

Figure 8:
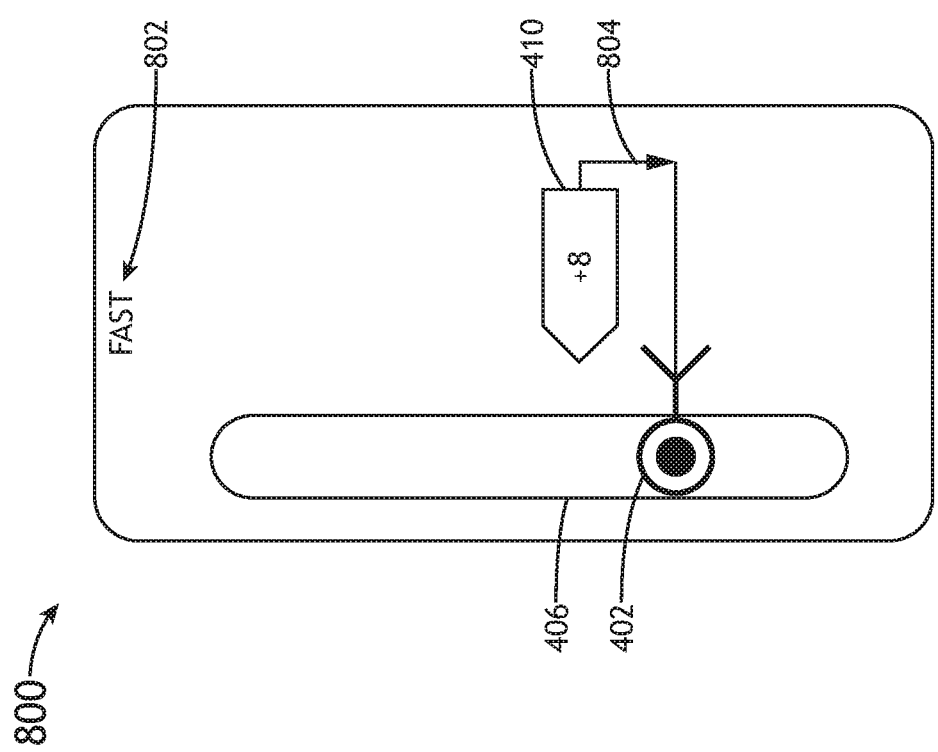
FIG. 8 is an exemplary view of a speed performance monitor GUI according to the inventive concepts disclosed herein.

Referring now to FIG. 8, an exemplary view 800 of the speed performance monitor GUI including a fast indicator 802 and a deceleration trend indicator 804 is shown. The fast indicator 802 may depict that the current speed is fast relative to the IM speed target. The deceleration trend indicator 804 may depict a deceleration trend. For example, when the current speed varies from the target speed by more than 5 knots (kts) or 0.02 Mach (e.g., Speed Conformance Monitoring Status=Out of Conformance), the current speed indicator 410 may fill (e.g., in white) and display a current speed error (+8 kts as shown in FIG. 8). Additionally, for example, the fast indicator 802 may appear at the top of the speed performance monitor GUI. Further, for example, deceleration trend indicator 804, which may include an arrow, may appear as the aircraft 100 makes a required speed adjustment to re-capture the target speed. The deceleration trend indicator 804 may indicate the predicted airspeed at predetermined time ahead (e.g., ten seconds ahead), at the current rate of change of speed.

Figure 9:
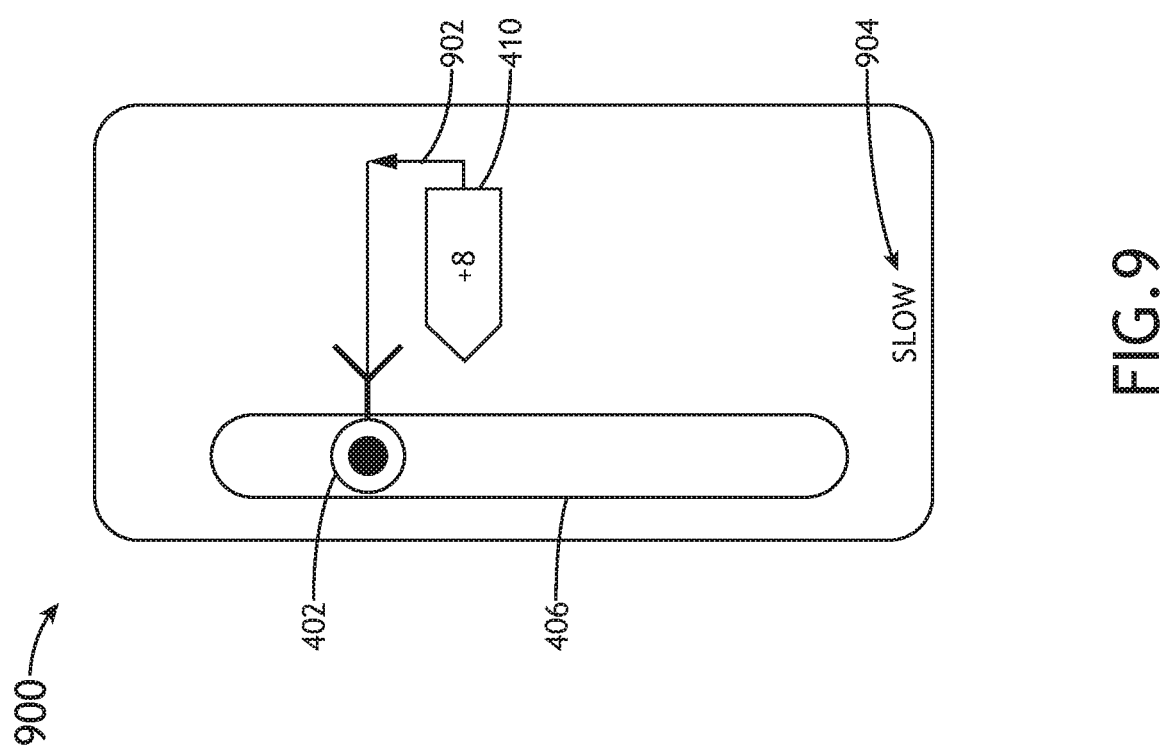
FIG. 9 is an exemplary view of a speed performance monitor GUI according to the inventive concepts disclosed herein.

Referring now to FIG. 9, an exemplary view 900 of the speed performance monitor GUI including a slow indicator 904 and an acceleration trend indicator 902 is shown. The slow indicator 904 may depict that the current speed is slow relative to the IM speed target. The acceleration trend indicator 902, which may include an arrow, may depict an acceleration trend. FIG. 9 illustrates the condition whereby the current speed is slow compared to the target speed, and the aircraft 100 is accelerating to match the target speed.

Figure 10:
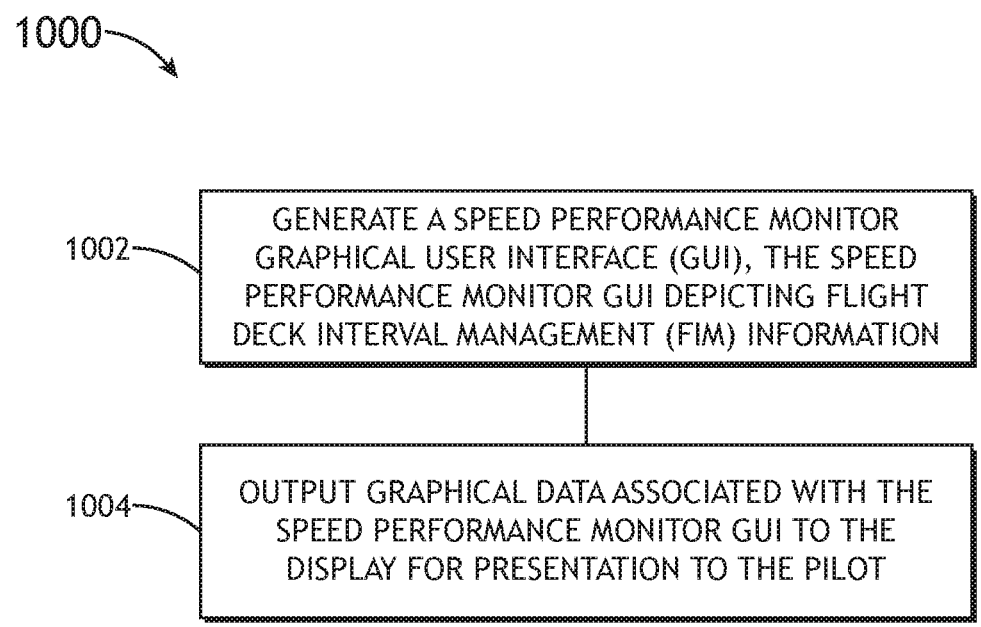
FIG. 10 is a diagram of an exemplary embodiment of a method according to the inventive concepts disclosed herein.

Referring now to FIG. 10, an exemplary embodiment of a method 1000 according to the inventive concepts disclosed herein may include one or more of the following steps. Some embodiments may include performing one or more steps of the method 1000 iteratively, concurrently, sequentially, and/or non-sequentially. Additionally, for example, some embodiments may include performing one or more instances of the method 1000 iteratively, concurrently, and/or sequentially.

A step 1002 may include generating a speed performance monitor graphical user interface (GUI), the speed performance monitor GUI depicting flight deck interval management (FIM) information.

A step 1004 may include outputting graphical data associated with the speed performance monitor GUI to a display for presentation to a pilot.

The steps 1002 and 1004 may be performed by the at least one processor 112, the at least one processor 122, the at least one processor 128, or some combination thereof.

Further, the method 1000 may include any of the operations disclosed throughout.

As will be appreciated from the above, embodiments of the inventive concepts disclosed herein may be directed to a system, device, and a method configured to generate a speed performance monitor GUI depicting FIM information and to output graphical data associated with the generated GUI to a display for presentation to a user (e.g., a pilot).

As used throughout and as would be appreciated by those skilled in the art, "at least one non-transitory computer-readable medium" may refer to as at least one non-transitory computer-readable medium (e.g., memory 114, memory 124, memory 130, storage 116, or a combination thereof; e.g., at least one computer-readable medium implemented as hardware; e.g., at least one non-transitory processor-readable medium, at least one memory (e.g., at least one non-volatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. An aircraft system, the system comprising:
   a display configured to present images to a pilot; and
   at least one processor communicatively coupled to the display, the at least one processor configured to:
   generate a speed performance monitor graphical user interface (GUI), the speed performance monitor GUI depicting flight deck interval management (FIM) information, the FIM information including an assigned time or distance spacing interval for an aircraft piloted by the pilot to maintain relative to a designated target aircraft, the speed performance monitor GUI comprising:
   an interval management (IM) speed range indicator depicting an IM speed range;
   an IM speed upper limit indicator depicting an IM speed upper limit and implemented at a first end of the IM speed range indicator;
   an IM speed lower limit indicator depicting an IM speed lower limit and implemented at a second end of the IM speed range indicator;
   an IM speed target indicator depicting an IM speed target, wherein at least a portion of the IM speed target indicator resides within the IM speed range indicator, if an aircraft configuration changes, a position of the IM speed target indicator is instantaneously adjusted within the IM speed range indicator; and
   a current speed indicator depicting a current speed relative to the IM speed target; and
   output graphical data associated with the speed performance monitor GUI to the display for presentation to the pilot.

2. The system of claim 1, wherein the speed performance monitor GUI further comprises a fast indicator or a slow indicator, the fast indicator depicting that the current speed is fast relative to the IM speed target, the slow indicator depicting that the current speed is slow relative to the IM speed target.

3. The system of claim 1, wherein the speed performance monitor GUI further comprises an acceleration trend indicator or a deceleration trend indicator, the acceleration trend indicator depicting an acceleration trend, the deceleration trend indicator depicting a deceleration trend.

4. The system of claim 3, wherein the acceleration trend indicator or the deceleration trend indicator comprises an arrow.

5. The system of claim 1, wherein the speed performance monitor GUI further comprises a rounded rectangle border surrounding the IM speed target indicator, the IM speed upper limit indicator, the IM speed range indicator, the IM speed lower limit indicator, and the current speed indicator.

6. The system of claim 5, wherein the rounded rectangle border is a first color when the speed performance monitor GUI is active and a different color when the speed performance monitor GUI is inactive.

7. The system of claim 1, wherein the IM speed upper limit indicator is set to a maximum speed for a current aircraft configuration or a default IM speed upper limit, wherein the IM speed lower limit indicator is set to a minimum maneuvering speed for the aircraft or a default IM speed lower limit.

8. The system of claim 1, wherein the IM speed target indicator comprises a circular portion residing within the IM speed range indicator.

9. The system of claim 8, wherein the IM speed target indicator further comprises a chevron portion residing outside of the IM speed range indicator, wherein when the current speed matches the target speed, a portion of the current speed indicator aligns with the chevron portion of the IM speed target indicator.

10. The system of claim 1, wherein the current speed indicator comprises a textual depiction of a speed differential between the current speed and the target speed.

11. The system of claim 1, wherein the current speed indicator comprises a textual depiction of a speed differential between the current speed and the target speed if the speed differential exceeds a predetermined speed differential.

12. The system of claim 1, wherein the current speed indicator further comprises a pentagonal-shaped outline.

13. The system of claim 1, wherein at least a portion of the IM speed target indicator flashes when a speed target value changes.

14. The system of claim 1, wherein the IM speed range indicator is capsule-shaped, wherein each of the IM speed upper limit indicator and the IM speed lower limit indicator includes an endcap portion.

15. The system of claim 1, wherein if the IM speed target exceeds one of the IM speed upper limit and the IM speed lower limit, at least one of the IM speed upper limit indicator or the IM speed lower limit indicator changes color.

16. The system of claim 1, wherein if the aircraft configuration changes, at least one of the IM speed upper limit indicator, the IM speed lower limit indicator, and the IM speed range indicator change.

17. The system of claim 16, wherein if the aircraft configuration changes, the IM speed range indicator changes color or flashes.

18. A display device, the display device comprising:
   a display configured to present images to a pilot; and
   at least one processor communicatively coupled to the display, the at least one processor configured to:
   generate a speed performance monitor graphical user interface (GUI), the speed performance monitor GUI depicting flight deck interval management (FIM) information, the FIM information including an assigned time or distance spacing interval for an aircraft piloted by the pilot to maintain relative to a designated target aircraft, the speed performance monitor GUI comprising:

an interval management (IM) speed range indicator depicting an IM speed range;

an IM speed upper limit indicator depicting an IM speed upper limit and implemented at a first end of the IM speed range indicator;

an IM speed lower limit indicator depicting an IM speed lower limit and implemented at a second end of the IM speed range indicator;

an IM speed target indicator depicting an IM speed target, wherein at least a portion of the IM speed target indicator resides within the IM speed range indicator, if an aircraft configuration changes, a position of the IM speed target indicator is instantaneously adjusted within the IM speed range indicator; and a current speed indicator depicting a current speed relative to the IM speed target; and output graphical data associated with the speed performance monitor GUI to the display for presentation to the pilot.

19. A method, the method comprising:

generating a speed performance monitor graphical user interface (GUI), the speed performance monitor GUI depicting flight deck interval management (FIM) information, the FIM information including an assigned time or distance spacing interval for an aircraft piloted by the pilot to maintain relative to a designated target aircraft, the speed performance monitor GUI comprising:

an interval management (IM) speed range indicator depicting an IM speed range;

an IM speed upper limit indicator depicting an IM speed upper limit and implemented at a first end of the IM speed range indicator;

an IM speed lower limit indicator depicting an IM speed lower limit and implemented at a second end of the IM speed range indicator;

an IM speed target indicator depicting an IM speed target, wherein at least a portion of the IM speed target indicator resides within the IM speed range indicator, if an aircraft configuration changes, a position of the IM speed target indicator is instantaneously adjusted within the IM speed range indicator; and a current speed indicator depicting a current speed relative to the IM speed target; and outputting graphical data associated with the speed performance monitor GUI to a display for presentation to a pilot.

\* \* \* \* \*